United States Patent
Liao et al.

(10) Patent No.: US 11,770,811 B2
(45) Date of Patent: *Sep. 26, 2023

(54) EFFICIENT WIDE BANDWIDTH OPERATION AND EFFICIENT UE-SPECIFIC RF BANDWIDTH ADAPTATION

(71) Applicant: MEDIATEK INC., Hsin-Chu (TW)

(72) Inventors: Pei-Kai Liao, Hsin-Chu (TW); Tao Chen, Beijing (CN); Chien-Chang Li, Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/743,320

(22) Filed: May 12, 2022

(65) Prior Publication Data

US 2022/0272705 A1    Aug. 25, 2022

Related U.S. Application Data

(63) Continuation of application No. 16/932,952, filed on Jul. 20, 2020, now Pat. No. 11,357,007, which is a
(Continued)

(51) Int. Cl.
*H04W 72/04* (2023.01)
*H04W 72/0453* (2023.01)
(Continued)

(52) U.S. Cl.
CPC ....... *H04W 72/0453* (2013.01); *H04W 48/10* (2013.01); *H04W 48/16* (2013.01); *H04W 56/0005* (2013.01); *H04W 48/14* (2013.01)

(58) Field of Classification Search
CPC ............. H04W 72/0453; H04W 48/10; H04W 56/0005; H04W 48/14; H04L 5/0039; H04L 5/001

See application file for complete search history.

(56) References Cited

U.S. PATENT DOCUMENTS

2011/0034175 A1    2/2011  Fong et al. .................. 455/450
2011/0128942 A1    6/2011  Kim et al. ................... 370/336
(Continued)

FOREIGN PATENT DOCUMENTS

| CN | 105610563 A | 2/2011 |
|---|---|---|
| CN | 106165472 A | 4/2014 |
| TW | 201616895 A | 10/2014 |

OTHER PUBLICATIONS

International Search Report and Written Opinion of International Search Authority for PCT/CN2018/072271 dated Apr. 2, 2018 (10 pages).

(Continued)

*Primary Examiner* — Fahmida S Chowdhury
(74) *Attorney, Agent, or Firm* — Helen Mao; Zheng Jin; Imperium Patent Works

(57) ABSTRACT

In one novel aspect, a plurality of synchronization signal (SS) anchors within a block of a contiguous spectrum is configured in a wireless network. Each SS anchor is a primary SS anchor or a secondary SS anchor. The UE performs an initial access by detecting a first primary SS anchor and receives one or more virtual carrier configurations with corresponding SS anchors within the block of the contiguous spectrum. In another novel aspect, the UE performs an initial access through a first RF band with a first bandwidth and a first center frequency, receives a switching signal to switch from the first RF band to a second RF band with a second bandwidth and a second center frequency, the second bandwidth is different from the first bandwidth, and performs a RF bandwidth adaptation from the first RF band to the second RF band based on the adaptation signal.

20 Claims, 9 Drawing Sheets

Related U.S. Application Data continuation of application No. 15/868,015, filed on Jan. 11, 2018, now Pat. No. 10,764,892.

(60) Provisional application No. 62/474,100, filed on Mar. 21, 2017, provisional application No. 62/444,879, filed on Jan. 11, 2017.

(51) Int. Cl.
*H04W 56/00* (2009.01)
*H04W 48/10* (2009.01)
*H04W 48/16* (2009.01)
*H04W 48/14* (2009.01)

(56) References Cited

U.S. PATENT DOCUMENTS

| | | | | |
|---|---|---|---|---|
| 2014/0036821 | A1 | 2/2014 | Mcnamara et al. | 370/329 |
| 2014/0044027 | A1* | 2/2014 | Beale | H04W 56/00 370/311 |
| 2014/0050206 | A1* | 2/2014 | Seo | H04J 11/0069 370/336 |
| 2014/0307685 | A1* | 10/2014 | Takano | H04L 5/0064 370/329 |
| 2014/0334399 | A1* | 11/2014 | Xu | H04W 72/1268 370/329 |
| 2015/0124638 | A1 | 5/2015 | Sun et al. | 370/252 |
| 2015/0173101 | A1 | 6/2015 | Webb et al. | 370/329 |
| 2015/0195849 | A1* | 7/2015 | Bashar | H04L 5/0092 370/330 |
| 2015/0208263 | A1 | 7/2015 | Behravan et al. | 370/252 |
| 2015/0215879 | A1* | 7/2015 | Zhu | H04W 56/0015 370/350 |
| 2015/0296397 | A1 | 10/2015 | Dural et al. | 370/252 |
| 2015/0296514 | A1* | 10/2015 | Morioka | H04L 5/0098 370/329 |
| 2015/0305005 | A1 | 10/2015 | Webb et al. | 370/336 |
| 2016/0127991 | A1 | 5/2016 | Ang et al. | 455/522 |
| 2016/0219626 | A1 | 7/2016 | Martin | 370/329 |
| 2017/0086175 | A1* | 3/2017 | Yasukawa | H04L 5/0053 |
| 2017/0094621 | A1* | 3/2017 | Xu | H04W 72/23 |
| 2017/0150330 | A1* | 5/2017 | Kim | H04W 76/10 |
| 2018/0146478 | A1* | 5/2018 | Kim | H04W 72/23 |

OTHER PUBLICATIONS

R1-1611655 3GPP TSG RAN WG1 Meeting #87, Huawei et al., "Mechanisms of bandwidth adaptation for control and data reception in single-carrier and multi-carrier cases", Reno, USA, Nov. 14-18, 2016.

Taiwan IPO, office action for the TW patent application 107139982 (No English translation is available) dated Apr. 30, 2019 (8 pages).

EPO, office action for the EP patent application 18738902.8 dated Jan. 14, 2020 (18 pages).

R1-157068 3GPP TSG RAN WG1 #83, Qualcomm Incorporated, "Design Principles for NB-IoT SYNC Channel", Anaheim, USA, Nov. 15-22, 2015 (6 pages) Section 2.3.1, par, 1,2; figure 2, Section 1, first two points, Section 2.1, points 4,5, Section 2.2, point 1.

R1-161948 3GPP TSG RAN WG1 NB-IoT Ad-Hoc Meeting, MediaTek Inc., "Remaining issued on NB-RS", Sophia Antipolis, France, Mar. 22-24, 2016 (4 pages) Section 2.1, "Proposal 1..", last par., 1.4-7,table 1, Section 2.2, par. 1, first instance of "Agreements:", last two sub-points.

R1-1609562 3GPP TSG RAN WG1 Meeting #86bis, MediaTek Inc., "Consideration on narrowband anchor based access", Lisbon, Portugal, Oct. 10-14, 2016 (4 pages) Section 2.1; figure 1.

International Search Report and Written Opinion of International Search Authority for Application 22158325.5 dated Apr. 12, 2022 (12 pages).

R2-1700384 3GPP TSG RAN WG2 NR Ad hoc, NTT DOCOMO, Inc.., "Frequency Domain resources for NR measurements", Spokane, USA, Jan. 17-19, 2017. section 2.1, 2.3, "5. Annex A." Figures of Section 2.1, 2.3.

R1-1700945 3GPP TSG RAN WG1 NR AH, Samsung, "Bandwidth adaptation for UE power saving", Spokane, USA, Jan. 17-19, 2017. Section 1 Section 2, par. 1 Section 2, "Case 2.." and following points.

R1-1609562 3GPP TSG RAN WG1 Meeting #86bis, MediaTek Inc., "Consideration on narrowband anchor based access", Lisbon, Portugal, Oct. 10-14, 2016. Section 2.1; figure 1.

China IPO, office action for the Chinese patent application 201880002284.4 (No. English translation is available), dated Oct. 26, 2022 (9 pages).

R1-157068, Qualcomm Incorporated, Design Principles for NB-IoT SYNC Channel, 3GPP TSG RAN WG1 #83, dated Nov. 15-22, 2015 (6 pages).

* cited by examiner

EFFICIENT WIDE BANDWIDTH OPERATION AND EFFICIENT UE-SPECIFIC RF BANDWIDTH ADAPTATION

CROSS REFERENCE TO RELATED APPLICATIONS

This application is a continuation, and claims priority under 35 U.S.C. § 120 from nonprovisional U.S. patent application Ser. No. 16/932,952, entitled "Efficient Wide Bandwidth Operation and Efficient UE-Specific RF Bandwidth Adaptation", filed on Jul. 20, 2020, the subject matter of which is incorporated herein by reference. Application Ser. No. 16/932,952 is a continuation, and claims priority under 35 U.S.C. § 120 from nonprovisional U.S. patent application Ser. No. 15/868,015, entitled "Efficient Wide Bandwidth Operation and Efficient UE-Specific RF Bandwidth Adaptation", filed on Jan. 11, 2018, the subject matter of which is incorporated herein by reference. Application Ser. No. 15/868,015, in turn, claims priority under 35 U.S.C. § 119 U.S. provisional application 62/444,879 entitled "EFFICIENT WIDER BANDWIDTH OPERATION FOR OFDMA SYSTEMS" filed on Jan. 11, 2017, and application 62/474,100 entitled "EFFICIENT UE-SPECIFIC RF BANDWIDTH ADAPTATION" filed on Mar. 21, 2017, the subject matter of which is incorporated herein by reference.

TECHNICAL FIELD

The disclosed embodiments relate generally to wireless communication, and, more particularly, to methods and apparatus for efficient wider bandwidth operation and efficient UE-specific RF bandwidth adaptation.

BACKGROUND

Mobile networks communication continues to grow rapidly. The mobile data usage will continue skyrocketing. New data applications and services will require higher speed and more efficient. Large data bandwidth application continues to attract more consumers. New technologies are developed to meet the growth such as carrier aggregation (CA), which enables operators, vendors, content providers and the other mobile users to meet the increasing requirement for the data bandwidth. However, carrier aggregation assumes multiple RF chains for signal reception even for physically contiguous spectrum, which introduces long transition time to activate more carriers from one carrier for larger data bandwidth and decreases the efficiency of the data transmission.

In frequency bands above 3 GHz, there could be a block of physically continuous spectrum up to hundreds of MHz. The single carrier operation for such large continuous spectrum is more efficient in both the physical (PHY) control, with lower control signaling overhead, and PHY data, with higher trunking gains. It is, therefore, to configure the large contiguous spectrum for large data transmission instead of configuring multiple small spectrum resources. However, from the system level, not all the user equipment (UEs) require large channel bandwidth. Further, for each UE, not all applications require large channel bandwidth. Given that wideband operation requires higher power consumption, the use of the large spectrum resource for control signaling monitoring and low-data-rate services is not ideal for power saving and bandwidth efficiency.

In the 3GPP RAN1, 5G base station should be able to support UEs operating with single wideband carrier & UEs operating with intra-band carrier aggregation over the same contiguous spectrum simultaneously. It is also agreed that UE RF bandwidth adaptation is supported for single-carrier operation. How to support UEs operating with single wideband carrier and UEs operating with intra-band carrier aggregation over the same contiguous spectrum simultaneously requires new design.

Improvements and enhancements are required to facilitate 5G base station to support UEs operating with single wideband carrier & UEs operating with intra-band carrier aggregation over the same contiguous spectrum simultaneously and to facilitate UE RF bandwidth adaptation in single-carrier operation.

SUMMARY

Apparatus and methods are provided for multi-anchor structure and bandwidth adaptation. In one novel aspect, multi-anchor structure is provided in a contiguous RF spectrum. In one embodiment, a plurality of synchronization signal (SS) anchors within a block of a contiguous spectrum is configured in a wireless network, wherein each SS anchor is a primary SS anchor or a secondary SS anchor. The UE performs an initial access by detecting a first primary SS anchor within the block of the contiguous spectrum and receives one or more virtual carrier (VC) configurations with corresponding SS anchors within the block of the contiguous spectrum. In one embodiment, one or more downlink (DL) primary SS anchors are configured with synchronization signals and broadcasting channels for system information (SI). None, one or more DL secondary SS anchors are configured with synchronization signals. In another embodiment, one or more downlink (DL) primary SS anchors are configured with primary synchronization signal (PSS) and secondary synchronization signal (SSS) and broadcasting channels for system information (SI). None, one or more DL secondary SS anchors are configured with SSS only. In yet another embodiment, one or more downlink (DL) primary SS anchors are configured with PSS and SSS in the 1st relative timing SS1 and broadcasting channels for system information (SI). None, one or more DL secondary SS anchors are configured with PSS and SSS with the $2^{nd}$ relative timing SS2.

In one embodiment, one primary SS anchor and one or more secondary SS anchors are configured, and wherein each SS anchor uses a different code sequence, and wherein the UE uses the SS sequence in the primary SS anchor as a physical cell identification (PCI) for a common virtual carrier (CVC). In another embodiment, a plurality of primary SS anchors and one or more secondary SS anchors are configured, and wherein each SS anchor uses a different code sequence, and wherein the UE uses the SS sequence in one primary SS anchor that is used for initial access or being configured by the network as a physical cell identification (PCI) for a common virtual carrier (CVC).

In another novel aspect, the bandwidth adaptation is performed. In one embodiment, the UE performs an initial access in a wireless network within a contiguous bandwidth through a first RF configuration with a first bandwidth and a first center frequency, receives a switching signal to switch from the first RF configuration to a second RF configuration with a second bandwidth and a second center frequency, wherein the second bandwidth is different from the first bandwidth, and performs a RF bandwidth adaptation from the first RF configuration to the second RF configuration based on the adaptation signal. In one embodiment, the UE monitors paging messages using a third RF configuration with a third bandwidth and a third center frequency in a UE IDLE mode, wherein the third RF bandwidth is smaller than at least one of the first bandwidth and the second bandwidth. In one embodiment, the switching signal is a bandwidth adaptation signal comprising at least one adaptation signal comprising: a bandwidth and a center frequency location of a target VC, a DL transmission power spectral density (PSD) of a target VC, a UL power control command for UL transmission power adjustment over the target VC, a triggering signal of DL aperiodic reference signal (RS) for channel status information (CSI) measurement, and a triggering signal of UL sounding reference signal (SRS) transmission. In another embodiment, the switching signal is a virtual carrier (VC) configuration switch signal comprising at least one VC signal comprising: a VC configuration index, a bandwidth and a center frequency location of a target VC, a DL transmission power spectral density (PSD) of a target VC, a UL power control command for UL transmission power adjustment over the target VC.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
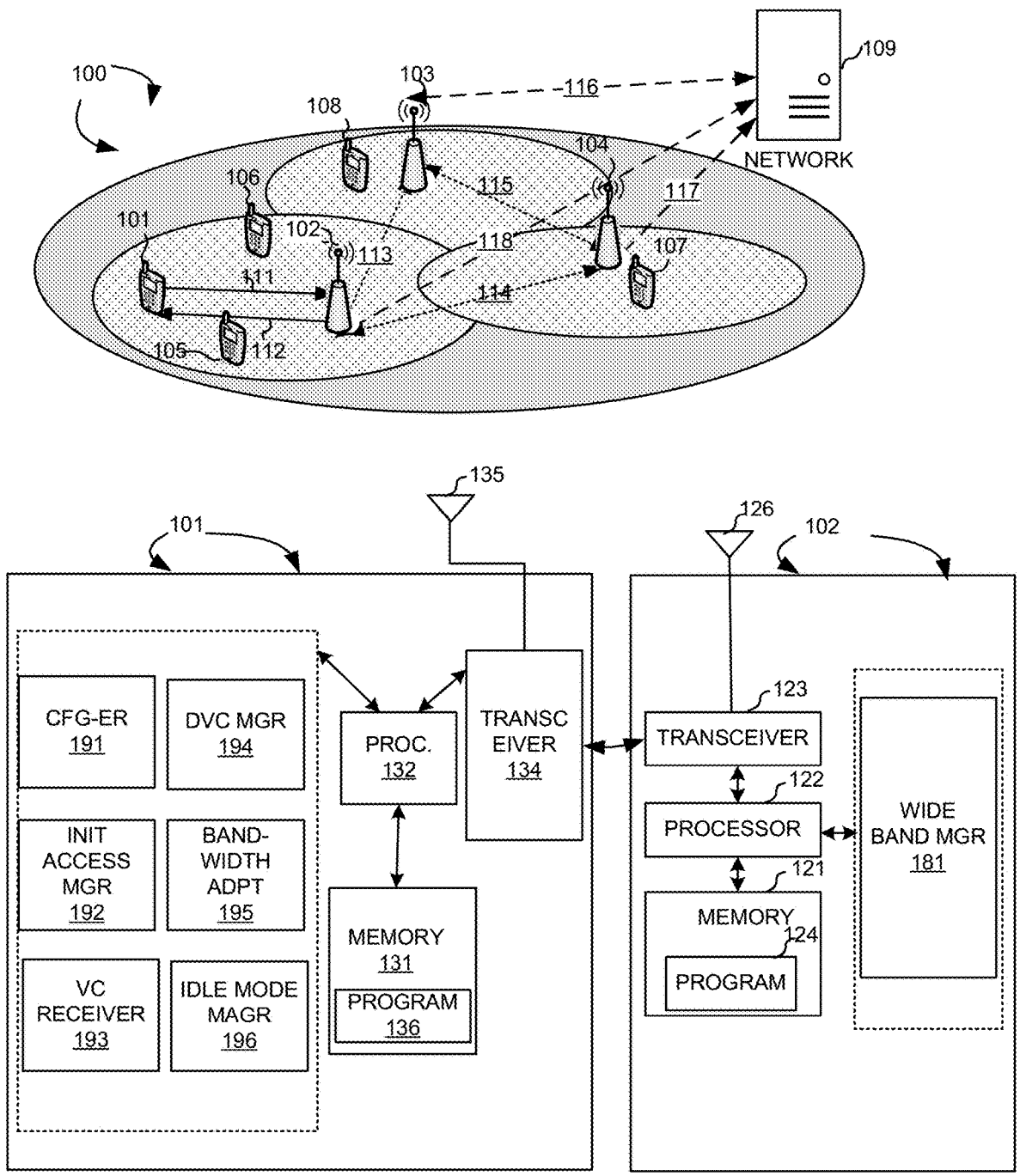
FIG. 1 illustrates a system diagram of a wireless network with multiple synchronization signal (SS) anchors configured in one contiguous bandwidth carrier in accordance with embodiments of the current invention.

FIG. 1 illustrates a system diagram of a wireless network 100 with multiple synchronization signal (SS) anchors configured in one contiguous bandwidth carrier in accordance with embodiments of the current invention. Wireless communication system 100 includes one or more wireless networks each of the wireless communication network has fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, a gNB, or by other terminology used in the art. Each of the base unit 102, 103, and 104 serves a geographic area. Backhaul connections 113, 114 and 115 connect the non-co-located receiving base units, such as 102, 103, and 104. These backhaul connections can be either ideal or non-ideal A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103.

In one embodiment, wireless communication network 100 operates with large contiguous radio spectrums. UE 101 while accessing wireless communication network 100, acquires synchronization information and system information using primary SS anchor. UE 101 subsequently acquires SS anchor configurations. UE 101 performs bandwidth adaptation based on the SS anchor configurations.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a wide band manager 181 that configures SS anchors, virtual carriers (VCs) and communicates with UEs to implement the wide band operations.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A configuration 191 configures a plurality of synchronization signal (SS) anchors within a block of a contiguous spectrum in a wireless network, wherein each SS anchor is a primary SS anchor or a secondary SS anchor. An initial access manager 192 configures a plurality of synchronization signal (SS) anchors within a block of a contiguous spectrum, wherein each SS anchor is a primary SS anchor or a secondary SS anchor. A virtual carrier (VC) receiver 193 receives one or more VC configurations with corresponding SS anchors within the block of the contiguous spectrum. A DVC manager 194 switches to a DVC containing a first secondary SS anchor and performs synchronization through the first secondary SS anchor. A bandwidth adaptor 195 performs an initial access through a first RF configuration with a first bandwidth and a first center frequency, receives a switching signal to switch from the first RF configuration to a second RF configuration with a second bandwidth and a second center frequency, wherein the second bandwidth is different from the first bandwidth, and performs a RF bandwidth adaptation from the first RF configuration to the second RF configuration based on the adaptation signal. An IDLE-mode manager 196 monitors paging messages using a third RF band with a third bandwidth and a third center frequency in a UE IDLE mode, wherein the third RF bandwidth is smaller than at least one of the first bandwidth and the second bandwidth.

Wider Band Operations with Multi-Anchor Structure

Figure 2A:
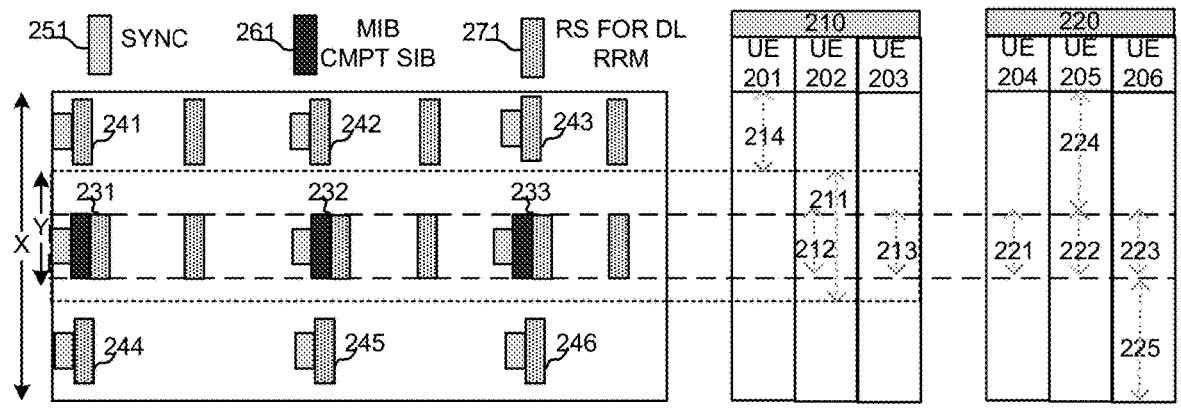
FIG. 2A illustrates an exemplary diagram of a multi-anchor structure with primary and secondary SS anchors contains synchronization signals in accordance with embodiments of the current invention.
Figure 2B:
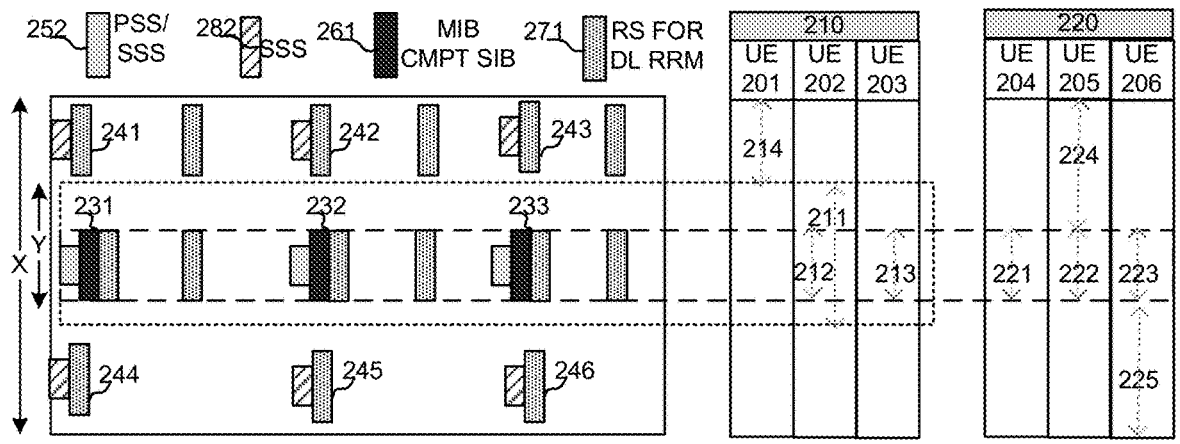
FIG. 2B illustrates an exemplary diagram of a multi-anchor structure with primary SS anchor contains PSS and SSS and secondary SS anchors contain SSS only signals in accordance with embodiments of the current invention.
Figure 2C:
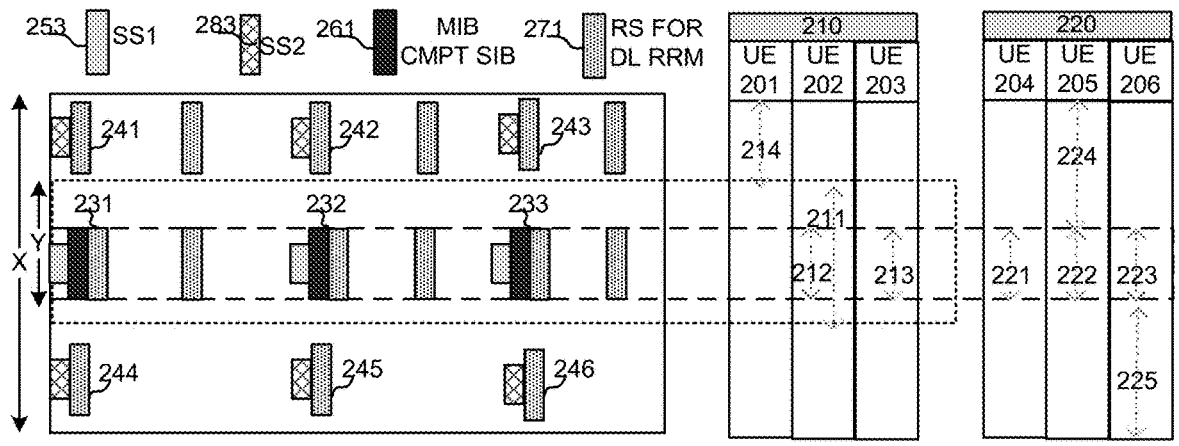
FIG. 2C illustrates an exemplary diagram of a multi-anchor structure with primary SS anchor contains PSS and SSS with the $1^{st}$ relative timing (SS1) and secondary SS anchors contain PSS and SSS with the $2^{nd}$ relative timing (SS2) signals in accordance with embodiments of the current invention.

In one novel aspect, multiple SS anchors are configured for a contiguous RF band. Each SS anchor is configured to be a primary SS anchor or a secondary SS anchor. One or more common virtual carrier (CVC) and one or more dedicated virtual carrier (DVC) are configured. There are different ways to configure the SS anchors. FIGS. 2A, 2B and 2C illustrates different embodiments the SS anchor configurations.

FIG. 2A illustrates an exemplary diagram of a multi-anchor structure with primary and secondary SS anchors contains synchronization signals in accordance with embodiments of the current invention. Multiple SS anchors are configured by the wireless network with a wide bandwidth X. In one embodiment, the bandwidth X is 100M. Other network may configure different wide band. A CVC with a bandwidth Y is configured. In one embodiment, bandwidth Y is 20M, with a synchronization signal (SS) occupying a bandwidth of 10M. Multiple primary SS anchors 231, 232, and 233 are configured. Multiple secondary SS anchors 241, 242, 243, 244, 245 and 246. In one embodiment, UE 201, 202, and 203 operate in single carrier mode 210. UE 204, 205, and 206 operate in multi-carrier mode 220. The UEs are configured with different CVC and/or DVC in single carrier mode. The UEs are further configured with primary cell (PCell) and secondary cell (SCell) in multi-carrier mode. UE 201 in single carrier mode is configured with DVC 214. UE 202 in single carrier mode is configured with CVC 212 and DVC 211. UE 203 in single carrier mode is configured with CVC 213. UE 204 in multi-carrier mode is configured with PCell 221. UE 205 in multi-carrier mode is configured with PCell 222 and SCell 224. UE 206 in multi-carrier mode is configured with PCell 223 and SCell 225. The CVC should contain at least one DL primary SS anchor. The DVC should contain at least one DL secondary SS anchor. In one embodiment, one or more DL primary SS-anchors, which include synchronization signal(s) 251 and physical-channels carrying the minimal system information for RACH, including MIB and compact SIB 261, and RS for DL RRM and/or fine synchronization signals 271. one or more, DL secondary SS-anchors, which include synchronization signal(s) 251. The UE access the network through a primary SS anchor. The UE, when switching to a DVC, performs synchronization through the secondary SS anchor.

When UE performs initial access, the UE needs to find the primary SS anchor. To facilitate the process of locating the primary SS anchor, different configurations are used.

FIG. 2B illustrates an exemplary diagram of a multi-anchor structure with primary SS anchor contains PSS and SSS and secondary SS anchors contain SSS only signals in accordance with embodiments of the current invention. Similar to FIG. 2A, multiple primary and secondary SS anchors are configured. In one embodiment, the synchronization signal 252, which includes the primary synchronization signal (PSS) and the secondary synchronization signal (SSS) are included. The secondary SS anchor, however, only includes SSS 282. The UE while searching for the primary SS anchor will skip the secondary SSS anchors because it cannot detect the PSS. This configuration facilitates the UE to locate the primary SS anchor.

FIG. 2C illustrates an exemplary diagram of a multi-anchor structure with primary SS anchor contains PSS and SSS with the $1^{st}$ relative timing (SS1) and secondary SS anchors contain PSS and SSS with the $2^{nd}$ relative timing (SS2) signals in accordance with embodiments of the current invention. Similar to FIG. 2B, different synchronization signal is used for secondary SS anchor. The DL primary SS anchor includes PSS and SSS with $1^{st}$ relative timing (SS1) 253 with the PSS in the first symbol followed by the SSS and physical-channels carrying the minimal system information for RACH. The DL secondary SS anchor includes PSS and SSS with $2^{nd}$ relative timing (SS2) with the SSS in the first symbol followed by the PSS. When the UE detects the secondary SSS anchor, because the PSS and SSS are in the $2^{nd}$ relative timing, it cannot use it as the synchronization signal and will skip the secondary SSS anchor. This configuration also facilitates the UE to locate the primary SS anchor.

There are different configurations for the CVC and DVC with the primary and second SS anchors. Different embodiments are provided to locate the synchronization signals for different configurations.

Figure 3A:
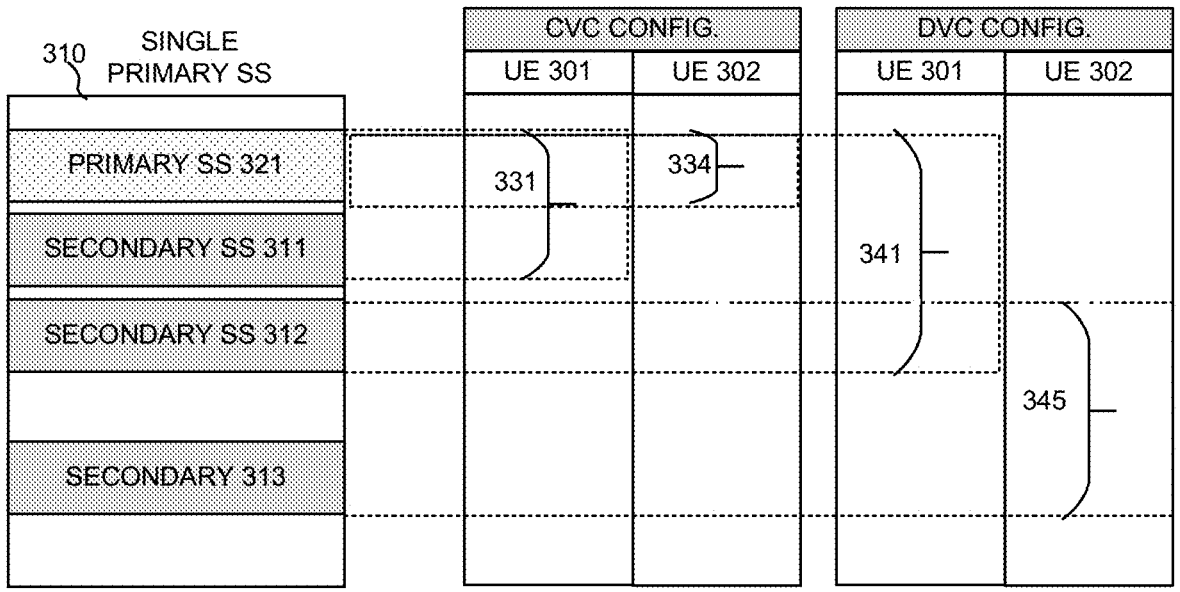
FIG. 3A illustrates an exemplary diagram for the configuration of one primary SS-anchor plus one or more secondary SS-anchors within a block of contiguous spectrum using single-carrier operation in accordance with embodiments of the current invention.

FIG. 3A illustrates an exemplary diagram for the configuration of one primary SS-anchor plus one or more secondary SS-anchors within a block of contiguous spectrum using single-carrier operation in accordance with embodiments of the current invention. In one embodiment, the synchronization signal(s) in all SS-anchors share the same code sequence. The UE access the CVC and DVC using the detected SS. In another embodiment, synchronization signal(s) in all SS-anchors use a different code sequence from each other. With different code sequences, it results in better efficiency for AGC due to lower PAPR if UE uses single RF chain to receive the signal over the whole block of contiguous spectrum. Further, LTE carrier aggregation mechanism can be maximally reused to support carrier aggregation over the block of contiguous spectrum. The network is configured the single primary SS anchor 310 include a primary SS 321, secondary SS 311, 312 and 313. CVC 331 for UE 301 is configured with primary SS anchor 321 and secondary SS anchors 311. CVC 334 for UE 302 is configured with primary SS anchor 321. If a CVC for a UE, such as UE 301, contains multiple SS-anchors, UE 301 assumes the synchronization signal sequence in the primary SS-anchor 321 as the physical cell identification for the CVC. In one embodiment, the location of other SS-anchors should be notified to the UE via RRC-layer signaling or MAC CE for coding chain rate matching in data channel. DVC 341 for UE 301 is configured with primary SS anchor 321 and secondary SS anchors 311 and 312. DVC 345 for UE 302 is configured with secondary SS anchors 312 and 313. If a DVC for a UE contains multiple SS-anchors, UE should assume the synchronization signal sequence in the secondary SS-anchor configured by the network via RRC-layer signaling or MAC CE as the physical cell identification for the DVC. In one embodiment, the location of other SS-anchors should be notified to the UE via RRC-layer signaling or MAC CE for coding chain rate matching in data channel.

Figure 3B:
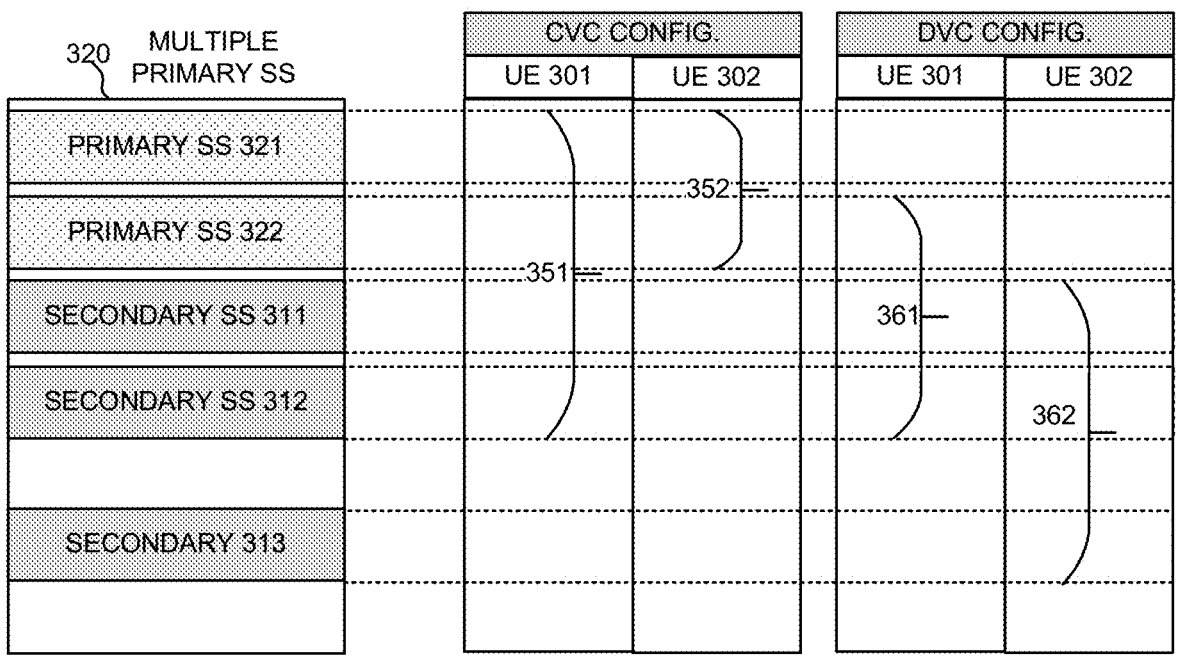
FIG. 3B illustrates an exemplary diagram for the configuration of multiple primary SS-anchor plus one or more secondary SS-anchors within a block of contiguous spectrum using single-carrier operation in accordance with embodiments of the current invention.

FIG. 3B illustrates an exemplary diagram for the configuration of multiple primary SS-anchor plus one or more secondary SS-anchors within a block of contiguous spectrum using single-carrier operation in accordance with embodiments of the current invention. In one embodiment, the synchronization signal(s) in all SS-anchors share the same code sequence. The UE access the CVC and DVC using the detected SS. In another embodiment, synchronization signal(s) in all SS-anchors use a different code sequence from each other. With different code sequences, it results in better efficiency for AGC due to lower PAPR if UE uses single RF chain to receive the signal over the whole block of contiguous spectrum. Further, LTE carrier aggregation mechanism can be maximally reused to support carrier aggregation over the block of contiguous spectrum. The network is configured the multiple primary SS anchor 320 include a primary SS 321 and primary SSS 322, secondary SS 311, 312 and 313. CVC 351 for UE 301 is configured with primary SS anchor 321, 322 and secondary SS anchors 311 and 312. CVC 352 for UE 302 is configured with primary SS anchors 321 and 322. If a CVC for a UE, such as UE 301, contains multiple SS-anchors, UE 301 assumes the synchronization signal sequence in the primary SS-anchor 331 as the physical cell identification for the CVC. In one embodiment, the location of other SS-anchors should be notified to the UE via RRC-layer signaling or MAC CE for coding chain rate matching in data channel. DVC 361 for UE 301 is configured with primary SS anchor 322 and secondary SS anchors 311 and 312. DVC 362 for UE 302 is configured with secondary SS anchors 311, 312, and 313. If a DVC for a UE contains multiple SS-anchors, UE should assume the synchronization signal sequence in the secondary SS-anchor configured by the network via RRC-layer signaling or MAC CE as the physical cell identification for the DVC. In one embodiment, the location of other SS-anchors should be notified to the UE via RRC-layer signaling or MAC CE for coding chain rate matching in data channel.

Figure 4:
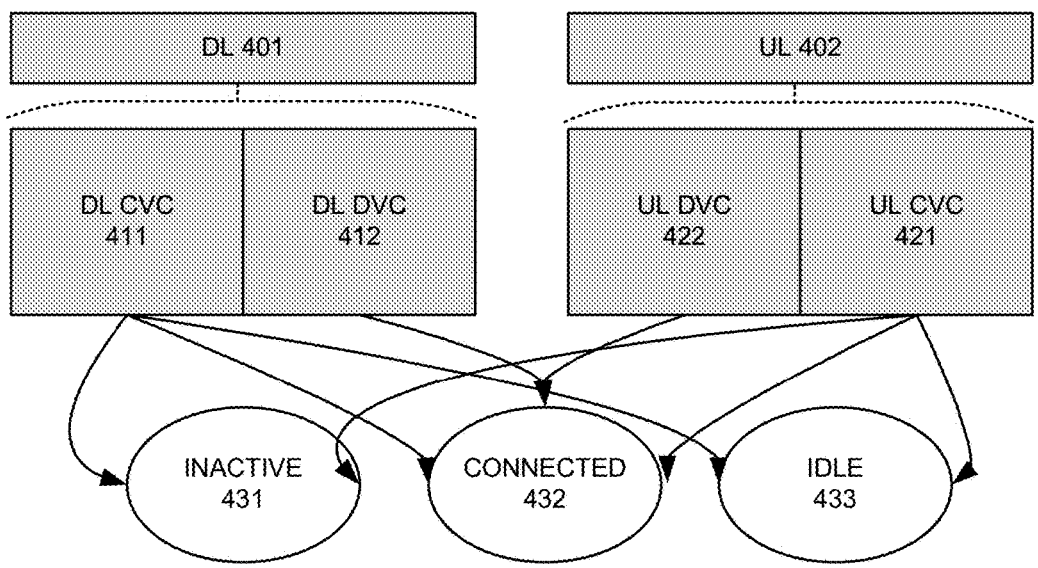
FIG. 4 illustrates an exemplary diagram of the single-carrier operation with CVC and DVC in accordance with embodiments of the current invention.

FIG. 4 illustrates an exemplary diagram of the single-carrier operation with CVC and DVC in accordance with embodiments of the current invention. The UE can be configured with DL CVC, DL DVC, UL CVC and UL DVC. DL configuration 401 includes DL CVC configure 411, and DL DVC configuration 412. UL configuration 402 includes UL CVC configuration 421 and UL DVC configuration 422.

In one embodiment, the DL CVC includes at least one primary SS anchor. UE can perform initial access or network entry and operate with CONNECTED state 432, INACTIVE state 431 and IDLE mode 433 over it. DL CVC 411 includes physical signals/channels supporting data services. Further, DL CVC 411 may include DL primary SS-anchor, and Reference signals for downlink RRM measurement, fine synchronization or both. The UE obtains the channel bandwidth of DL CVC through system information broadcasting/group-broadcasting such that it is common for all UEs receiving the system information. In one embodiment, the channel bandwidth of DL CVC can be broadcasted in the minimal system information carried in physical broadcasting channel. In another embodiment, the channel bandwidth of DL CVC can be broadcasted in the minimal system information carried in physical shared channel. DL CVC 411 CVC supports both common/group-common search space & UE-specific search space. The UE can perform handover from a DL CVC of a serving cell to a DL CVC of the targeted cell. Further the UE monitors paging message over it in IDLE mode. The UE also monitors DL/UL data scheduling over it in INACTIVE mode if minimal data service is allowed in INACTIVE mode.

In one embodiment, the DL DVC 412 includes at least one secondary SS anchor. The UE can operate with CONNECTED mode 432 only over DL DVC 412 after network entry. DL DVC 412 includes the physical signals/channels supporting data services. In one embodiment, DL DVC 412 further includes RS for DL RRM measurement. The UE obtains the channel bandwidth of DL DVC through RRC-layer signaling or MAC CE so it can be UE-specific. DL DVC 412 supports at least UE-specific search space but can be configured to support common search space. The configuration to support common search space is done by RRC-layer signaling or MAC CE. For UEs with to both activated DL CVC & activated DL DVC(s), no common search space is configured in DL DVC(s). For UEs with activated DL DVC(s) only, common search space is configured in one of the activated DL DVC(s). System information is not broadcasted to UEs periodically over the DL DVC but the system information can be broadcasted to UEs over the DL DVC supporting common search space when at least one of the UEs connected to the network via the DL DVC sends the request for system information broadcasting to the network. When the system information is updated, the network can unicast the updated part of the system information to a UE over one of the activated DL DVC 412. UE can perform handover from a DL DVC of a serving cell to a DL CVC of the targeted cell.

UL CVC 421 can be used by the UE to perform network entry and operate with CONNECTED mode 432, INACTIVE mode 431 and IDLE mode 433. UL CVC 421 includes the physical signals/channels supporting data services. In one embodiment, UL CVC 421 further includes UL physical random access channel for network entry, contention-based scheduling request and UL timing advance maintenance procedures. UL CVC 421 may also include UL physical-layer control channel(s) for uplink feedback. The UE obtains the channel bandwidth of UL CVC 421 through system information broadcasting/group-broadcasting such that it is common for all UEs receiving the system information. In one embodiment, the channel bandwidth of UL CVC can be broadcasted in the minimal system information carried in physical broadcasting channel. In another embodiment, the channel bandwidth of UL CVC 421 can be broadcasted in the minimal system information carried in physical shared channel. In one embodiment, the association between DL CVC 411 and UL CVC 421 is broadcasted in system information. The UE can perform handover from a UL CVC 421 of a serving cell to a UL CVC of the targeted cell.

UL DVC 422 can only be used by the UE in CONNECTED mode 432 after network entry. UL DVC 422 includes physical signals/channels supporting data services. In one embodiment, UL DVC 422 further includes UL physical-layer control channel(s) for uplink feedback. UL DVC 422 can be configured by RRC-layer signaling, MAC CE, Uplink physical random-access channel for network entry, contention-based scheduling request, or UL timing advance maintenance procedures. For UEs with both activated UL CVC & activated UL DVC(s), no uplink physical random-access channel is configured in UL DVC(s). For UEs with activated UL DVC(s) only, uplink physical random-access channel is configured in one of the activated UL DVC(s). UE obtains the channel bandwidth of UL DVC through RRC-layer signaling or MAC CE so it can be UE-specific. The association between DL DVC 412 UL DVC 422 is configured by RRC-layer signaling or MAC CE. The UE can perform handover from a UL DVC of a serving cell to a UL CVC of the targeted cell.

Efficient UE-Specific RF Bandwidth Adaptation

When the network is configured with wide contiguous bandwidth, the UE may perform bandwidth adaptation. In one novel aspect, the UE performs an initial access to the network with a first RF configuration. The UE subsequently performs bandwidth adaptation and switches to a wideband data pipe with a second RF configuration. In one embodiment upon finishing the data transmission, the UE performs bandwidth adaptation to switch to a third RF configuration in IDLE mode.

Figure 5:
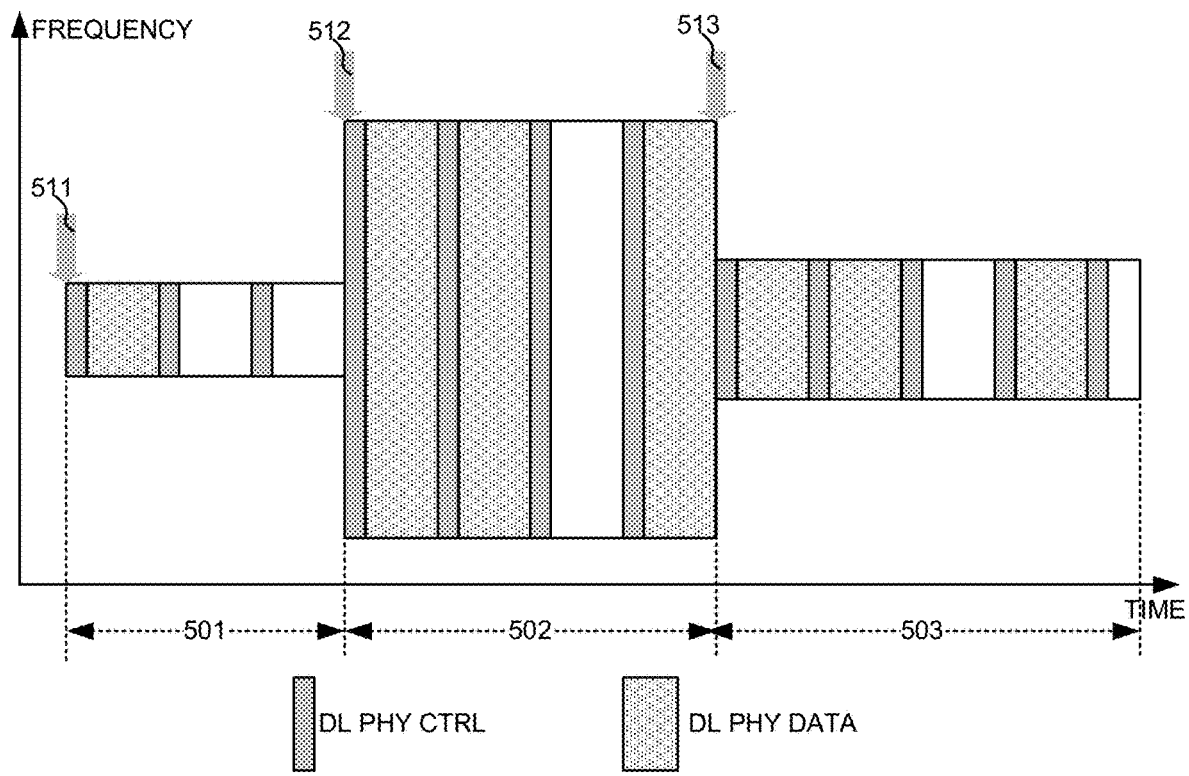
FIG. 5 illustrates an exemplary diagram for bandwidth adaptation in accordance with embodiments of the current invention.

FIG. 5 illustrates an exemplary diagram for bandwidth adaptation in accordance with embodiments of the current invention. The UE performs initial access 511 with a first RF configuration with a first center frequency and a first bandwidth. In one embodiment, the first bandwidth is smaller than the available bandwidth configured. The power consumption during the initial access period 501 is low. The UE subsequently starts data transmission after the initial access. At step 512, the UE performs bandwidth adaptation by performing wideband data pipe activation. The UE switches to a second RF configuration with a second center frequency and a second bandwidth. The second bandwidth is different from the first bandwidth. The first center frequency and the second center frequency can be the same or different. With a wider second bandwidth, the power consumption is high in the period 502. Upon completion of the data transmission, the UE performs another bandwidth adaptation 513 by performing wideband data pipe deactivation. The UE then switches to a third RF configuration with a third center frequency and a third bandwidth. The third bandwidth is smaller than the second bandwidth. The third bandwidth can be the same, smaller or larger than the first bandwidth. The UE stays with the third RF configuration during period 503 with lower power consumption.

Figure 6:
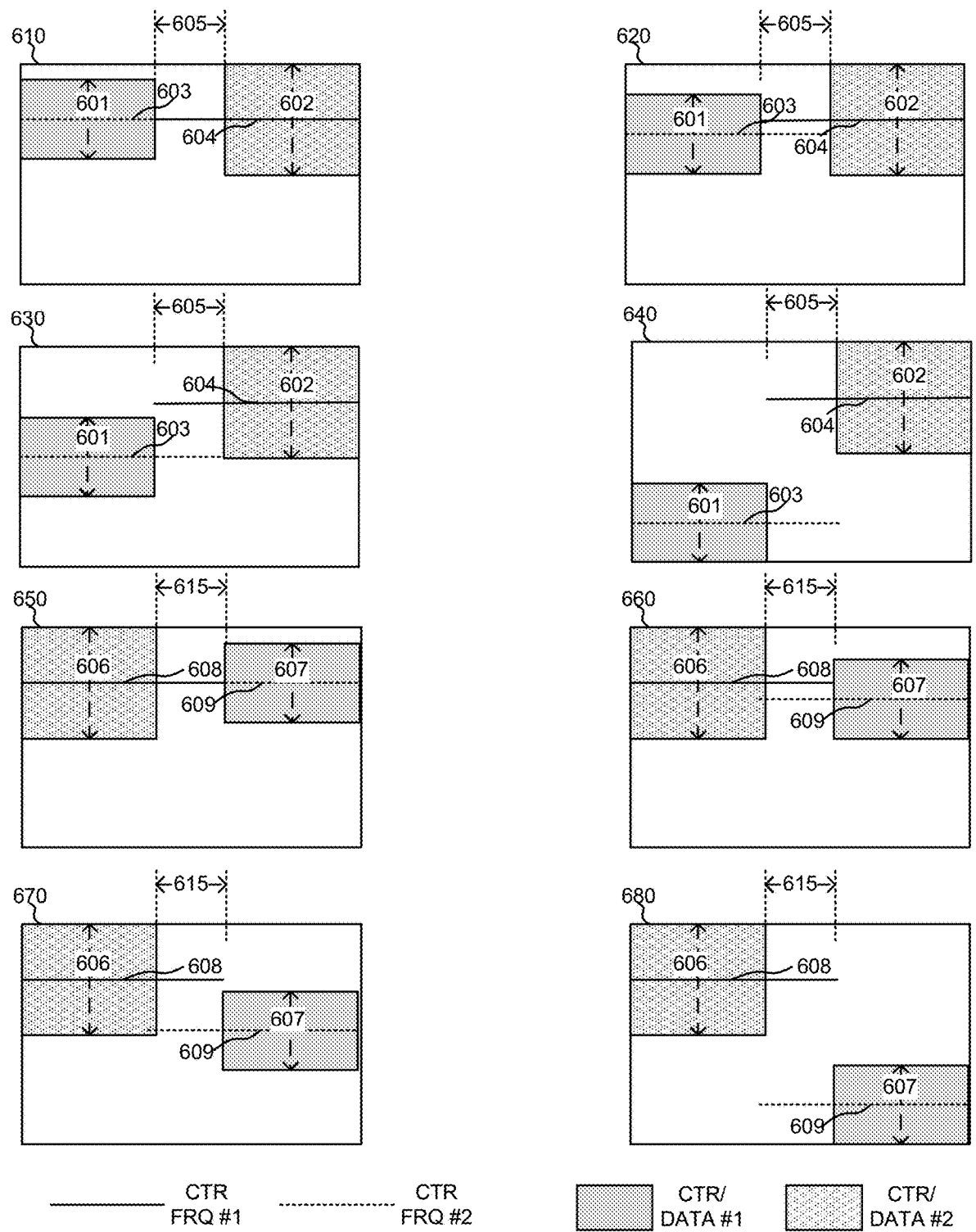
FIG. 6 illustrates exemplary diagrams for different scenarios for bandwidth adaptation in accordance with embodiments of the current invention.

FIG. 6 illustrates exemplary diagrams for different scenarios for bandwidth adaptation in accordance with embodiments of the current invention. The bandwidth adaptation includes switching from a smaller bandwidth to a larger bandwidth and vice versa. A UE operates with a first RF configuration 601 with a center frequency 603. After a transition period 605, the UE performs the bandwidth adaptation and switches to RF configuration 602 with a center frequency 604. RF configuration 601 has a smaller bandwidth than RF configuration 602. In one embodiment 610, RF configuration 601 and RF configuration 602 has the same center frequency. In another embodiment 620, RF configuration 601 and RF configuration 602 has different center frequencies. RF configuration 601 and RF configuration 602 have complete overlap. In another embodiment 630, RF configuration 601 and RF configuration 602 has different center frequencies. RF configuration 601 and RF configuration 602 have partial overlap. In yet another embodiment 640, RF configuration 601 and RF configuration 602 has different center frequencies. RF configuration 601 and RF configuration 602 have no overlap.

In a different scenario, the bandwidth adaptation switching from a larger bandwidth to a smaller bandwidth. A UE operates with a first RF configuration 606 with a center frequency 608. After a transition period 615, the UE performs the bandwidth adaptation and switches to RF configuration 607 with a center frequency 609. RF configuration 606 has a larger bandwidth than RF configuration 607. In one embodiment 640, RF configuration 606 and RF configuration 607 has the same center frequency. In another embodiment 660, RF configuration 606 and RF configuration 607 has different center frequencies. RF configuration 606 and RF configuration 607 have complete overlap. In another embodiment 670, RF configuration 606 and RF configuration 607 has different center frequencies. RF configuration 606 and RF configuration 607 have partial overlap. In yet another embodiment 680, RF configuration 606 and RF configuration 607 has different center frequencies. RF configuration 606 and RF configuration 607 have no overlap.

In one embodiment, UE supports UE-specific RF bandwidth adaptation from a first UE RF bandwidth to a second UE RF bandwidth, wherein a first UE RF bandwidth is different from a second UE RF bandwidth and their center frequencies may not be the same. In one embodiment, the UE supports the bandwidth adaptation in CONNECTED mode, INACTIVE mode & IDLE mode. In another embodiment, the UE supports the bandwidth adaptation in CONNECTED mode and INACTIVE mode only and not in IDLE mode. In yet another embodiment, the UE supports the bandwidth adaptation in CONNECTED mode only and not in INACTIVE mode and IDLE mode.

Figure 7:
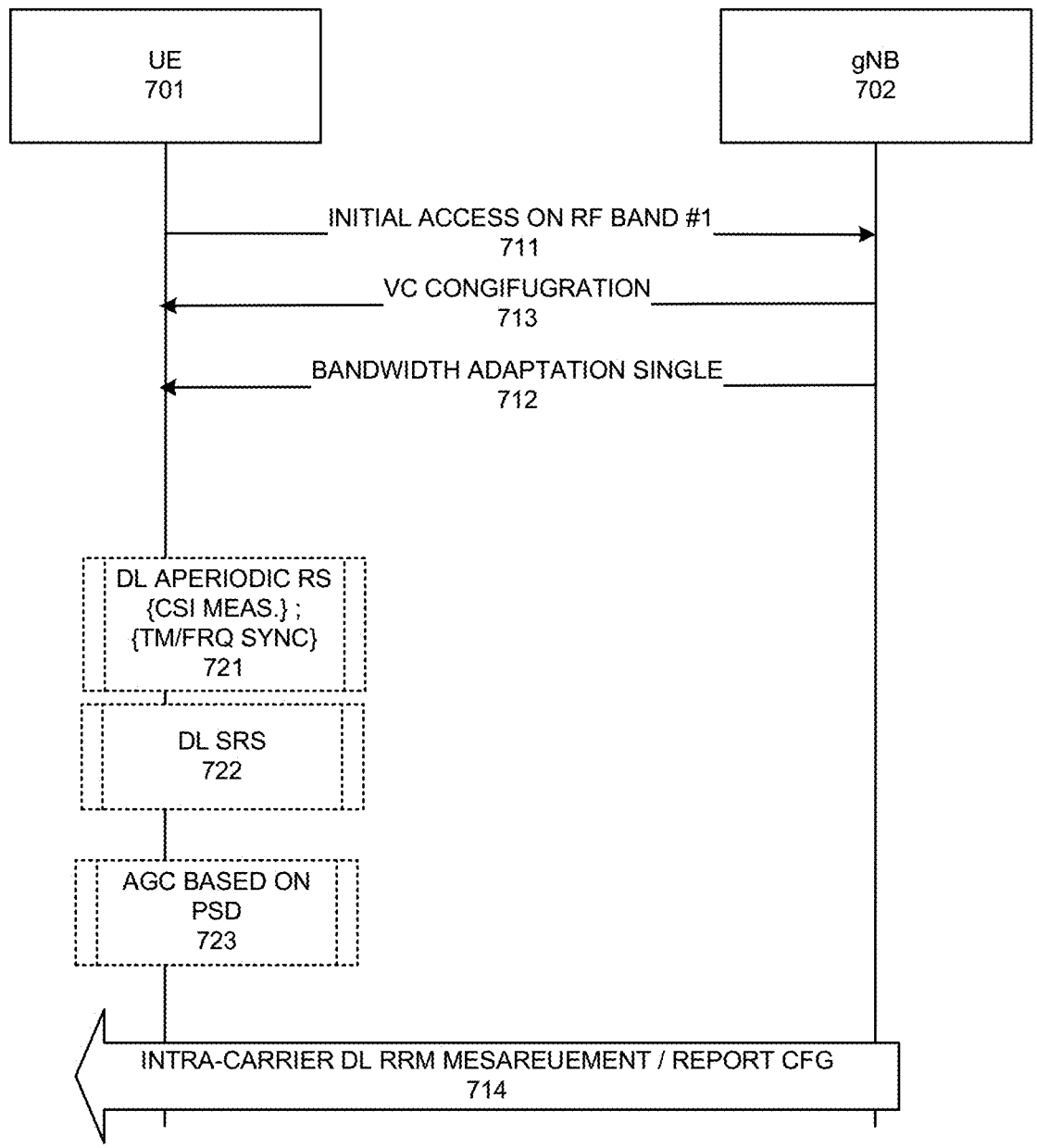
FIG. 7 illustrates an exemplary diagram for the UE bandwidth adaptation process in accordance with embodiments of the current invention.

FIG. 7 illustrates an exemplary diagram for the UE bandwidth adaptation process in accordance with embodiments of the current invention. UE 701 and gNB 702 are in the wireless network. At step 711, UE 701 performs initial access with gNB 702. In one embodiment, UE 701 performs initial access through CVC by detecting a primary SS anchor. Upon connected with gNB 702, UE 701 receives VC configuration 713 via RRC signaling and UE 701 receives a bandwidth adaptation signal at step 712. Bandwidth adaptation signaling is used to indicate to a UE which virtual carrier(s) (VC) is activated. In one embodiment, the bandwidth adaptation signaling can be signaled by MAC CE or physical-layer signaling. The physical-layer signaling has the benefit of shorter transition time of bandwidth adaptation and introduces less impact on UE throughput. In one embodiment, the bandwidth adaptation signaling is a dedicated signaling. The dedicated signaling has the benefit of flexibility and can be done any time without bundled with DL/UL data scheduling. The dedicated signaling can be a broadcast or a group-multicast signaling for multiple UEs or a unicast signaling to a UE. For broadcast/group-multicast signaling, the signaling content for multiple UEs can be aggregated into single physical-layer signaling, such as DCI, using a UE group ID such as the RNTI for a group of UEs, for detection. In one embodiment, the signaling content for each UE can be identified via embedded shortened UE ID. In another embodiment, the aggregated bandwidth adaptation signaling for multiple UEs can either increase the reliability with the same signaling overhead as non-aggregated bandwidth adaptation signaling or reduce the signaling overhead with the same reliability as non-aggregated bandwidth adaptation signaling by exploiting channel coding gain. In another embodiment, the bandwidth adaptation signaling is embedded in the DL/UL scheduler. The adaptation procedure applies to single carrier operation and intra-band and inter-band carrier aggregations.

The bandwidth adaptation signaling at step 712 includes at least one information including: a VC configuration index, the bandwidth and the center frequency location of the targeted VC, DL transmission power spectral density (PSD) of the targeted VC, the UL power control command for UL transmission power adjustment over the targeted VC, triggering of DL aperiodic reference signals transmission for CSI measurement/reporting, and triggering of UL sounding reference signal transmission for CSI measurement/reporting. In one embodiment, the DL PSD is an offset value to current VC. In another embodiment, the DL PSD is an absolute value of the PSD. In one embodiment, the UE utilizes the signaled DL transmission PSD of the targeted VC to speed up its AGC settling. In one embodiment, the power adjustment is an offset value to current VC. In another embodiment, the power adjustment is an absolute value.

In one embodiment, the bandwidth adaptation signaling includes triggering of CSI measurement/reporting on DL aperiodic RS. UE 701 at step 721, performs CSI measurement/reporting on DL aperiodic reference signals. In one embodiment, UE 701 uses the aperiodic DL CSI-RS transmission for time/frequency synchronization. In another embodiment, gNB 702 uses the triggered CSI reporting for DL data scheduling.

In another embodiment, the bandwidth adaptation signaling includes UL SRS. UE 701 at step 722, performs SRS transmission for CSI measurement/reporting by gNB 702. In one embodiment, gNB 702 uses the triggered UL SRS transmission for AGC settling and UL data scheduling.

In one embodiment, VC configuration signaling is received by UE 701 at step 713. The VC configuration signaling includes at least one of the information including a VC configuration index, the bandwidth and the center frequency location of the targeted VC, the DL PSD of the targeted VC, and the UL power control command for UL transmission power adjustment over the targeted VC. In one embodiment, the DL PSD is an offset value to current VC. In another embodiment, the DL PSD is an absolute value of the PSD. In one embodiment, at step 723, the UE utilizes the signaled DL transmission PSD of the targeted VC to speed up its AGC settling. In one embodiment, the power adjustment is an offset value to current VC. In another embodiment, the power adjustment is an absolute value.

In one embodiment, the DL transmission PSD offset of the target VC over the current VC, $\Delta S_{tx,after}$, is provided, UE 701 estimates its initial AGC level based on the received value. In one embodiment, the AGC level equals to the interference power estimation by measurements over OFDM symbols containing no common reference signals plus the result of the estimated pathloss times $\Delta S_{tx,after}$. In another embodiment, the AGC level equals to the historical estimation of interference power plus the estimated $S_{rx,before}$ plus the results of the estimated pathloss times $\Delta S_{tx,after}$.

In yet another embodiment, DL transmission PSD of the targeted VC, $S_{tx,after}$, is provided, UE 701 estimates its initial AGC level based on the received value. In one embodiment, the AGC level equals to the interference power estimation by measurements over OFDM symbols containing no common reference signals plus the result of the estimated pathloss times $S_{tx,after}$. In another embodiment, the AGC level equals to the historical estimation of interference power plus the results of the estimated pathloss times $S_{tx,after}$.

In another embodiment, DL RRM measurement is configured and performed by UE 701 at step 714. In one embodiment, intra-carrier DL RRM measurement/reporting configuration for a UE includes configuring a UE to perform DL RRM measurement/reporting (e.g. RSRP) within the activated VC(s) for both serving cell and neighboring cells, and configuring a UE to perform DL RRM measurement/reporting (e.g. RSRP & RSRQ) outside the activated VC(s) but within a carrier for both serving cell and neighboring cells.

Figure 8:
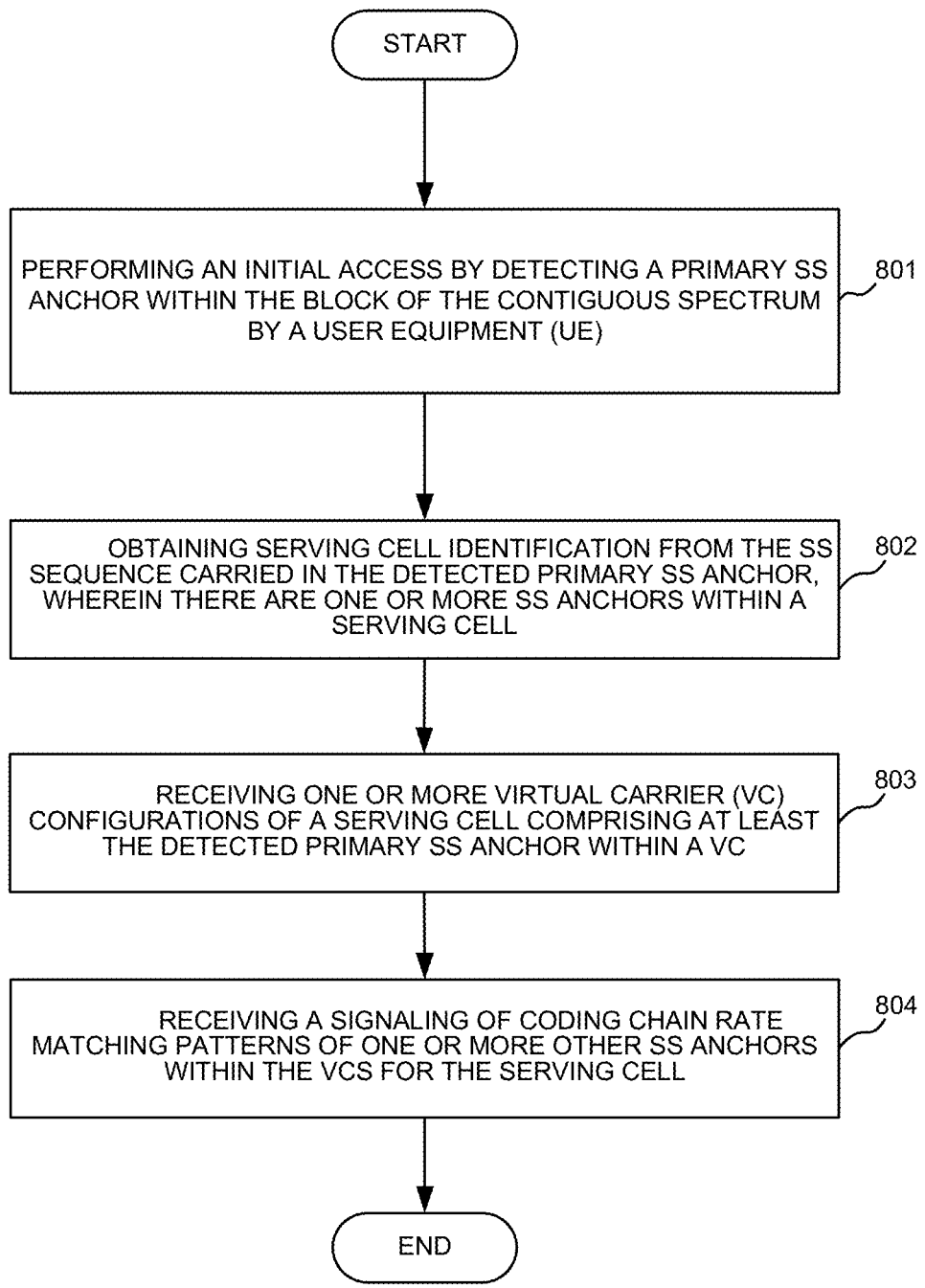
FIG. 8 illustrates an exemplary flow chart for the UE operation with multi-anchor structure in accordance with embodiments of the current invention.

FIG. 8 illustrates an exemplary flow chart for the UE operation with multi-anchor structure in accordance with embodiments of the current invention. At step 801, the UE performs an initial access by detecting a primary SS anchor within the block of the contiguous spectrum. At step 802, the UE obtains serving cell identification from the SS sequence carried in the detected primary SS anchor, wherein there are one or more SS anchors within a serving cell. At step 803, receives one or more virtual carrier (VC) configurations of a serving cell comprising at least the detected primary SS anchor within a VC. At step 804, the UE receives a signaling of coding chain rate matching patterns of one or more other SS anchors within the VCs for a serving cell.

Figure 9:
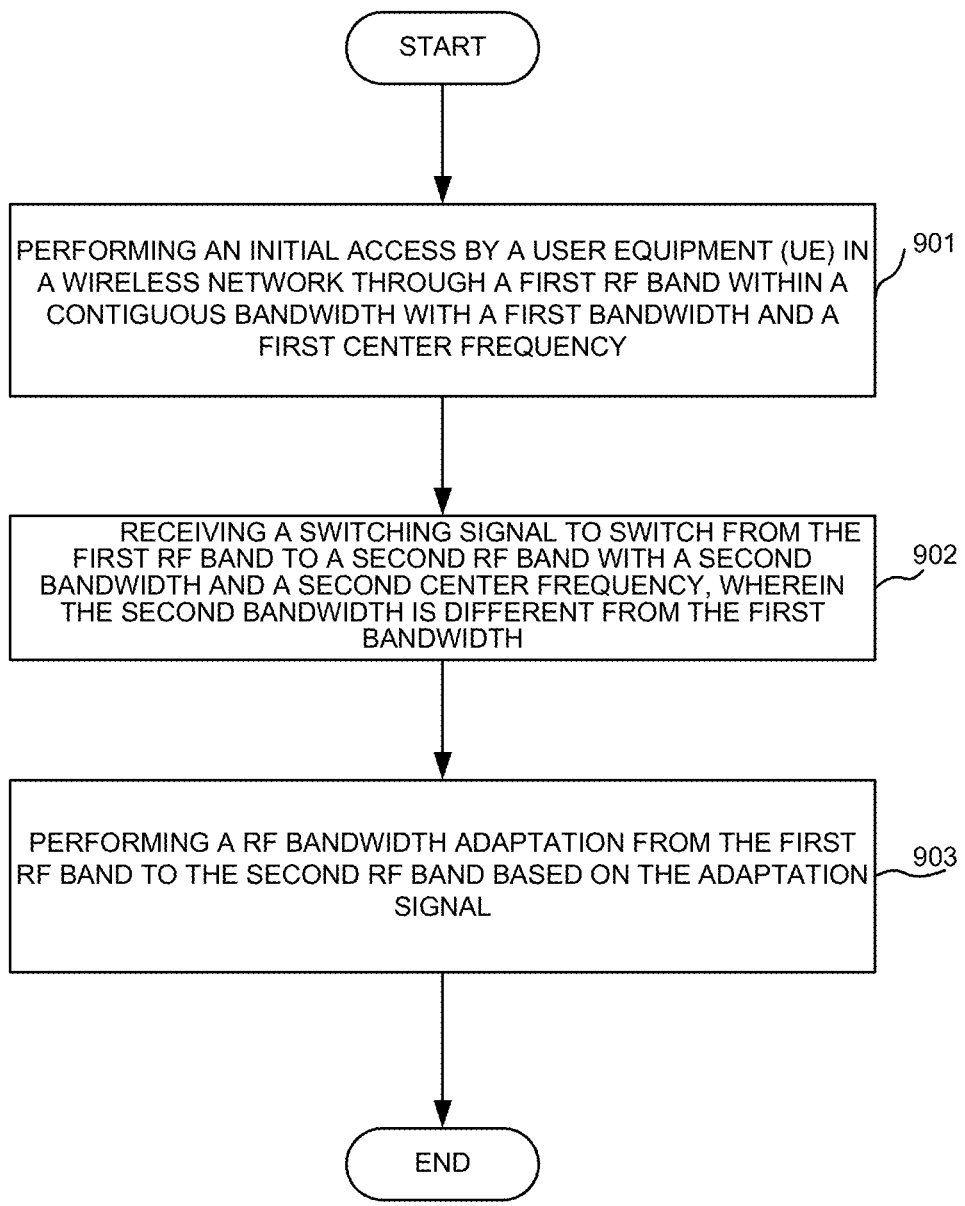
FIG. 9 illustrates an exemplary flow chart for the UE performing bandwidth adaptation in accordance with embodiments of the current invention.

FIG. 9 illustrates an exemplary flow chart for the UE performing bandwidth adaptation in accordance with embodiments of the current invention. At step 901, the UE performs an initial access in a wireless network through a first RF band within a contiguous bandwidth with a first bandwidth and a first center frequency. At step 902, the UE receives a switching signal to switch from the first RF band to a second RF band with a second bandwidth and a second center frequency, wherein the second bandwidth is different from the first bandwidth. At step 903, the UE performs a RF bandwidth adaptation from the first RF band to the second RF band based on the adaptation signal.

Figure 10:
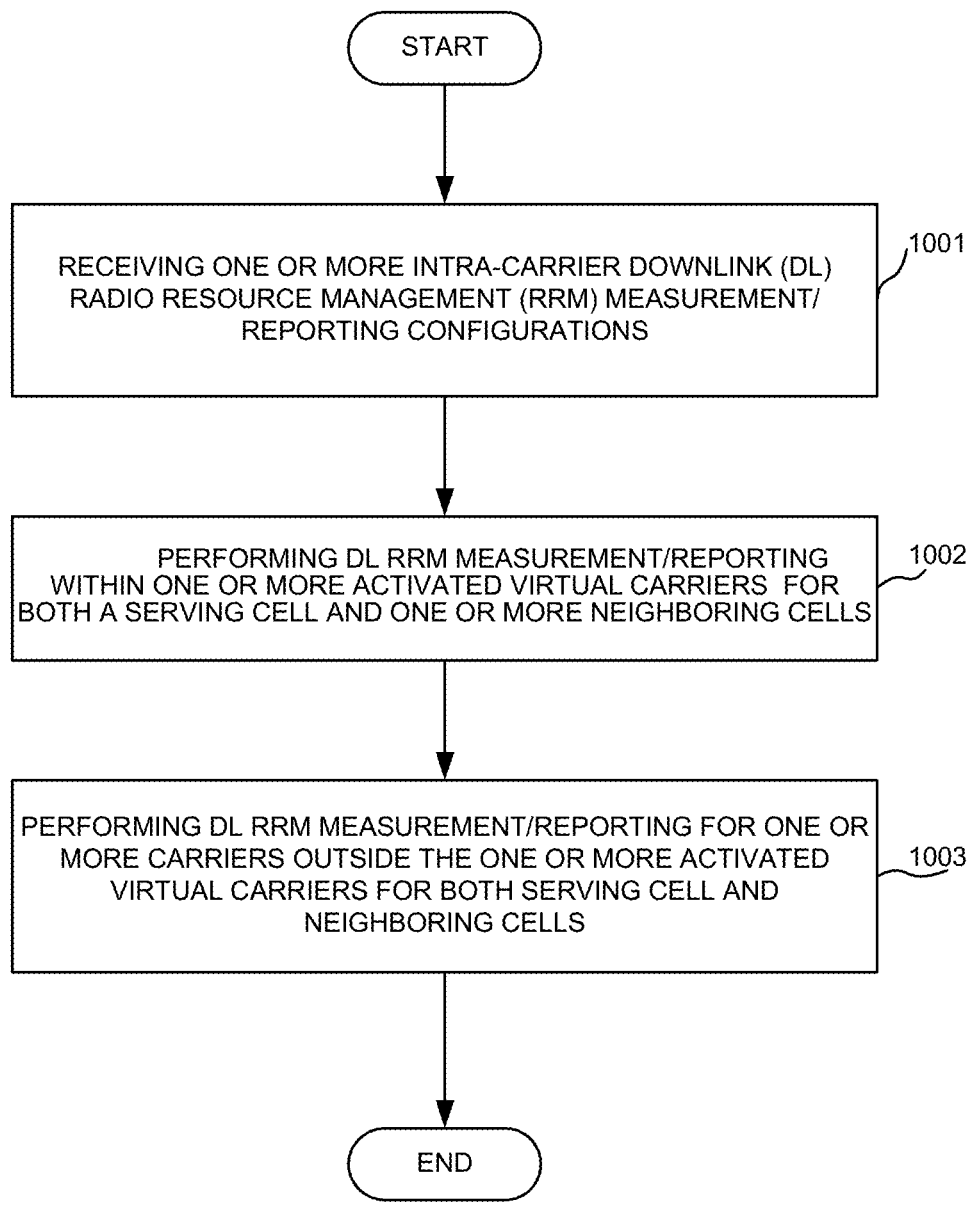
FIG. 10 illustrates an exemplary flow chart for the DL RRM in accordance with embodiments of the current invention.

FIG. 10 illustrates an exemplary flow chart for the DL RRM in accordance with embodiments of the current invention. At step 1001, the UE receives one or more intra-carrier downlink (DL) radio resource management (RRM) measurement/reporting configurations. At step 1002, the UE performs DL RRM measurement/reporting within one or more activated virtual carriers for both a serving cell and one or more neighboring cells. At step 1003, the UE performs DL RRM measurement/reporting for one or more carriers outside the one or more activated virtual carriers for both serving cell and neighboring cells.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
performing an initial access by detecting a primary synchronization signal (SS) anchor by a user equipment (UE);
obtaining a serving cell identification from an SS sequence carried in the detected primary SS anchor; and
receiving one or more virtual carrier (VC) configurations including a signaling of coding chain rate matching patterns for the one or more VCs from the serving cell;
subsequently, switching to a dedicated virtual carrier (DVC) containing a first secondary SS anchor; and
performing synchronization through the first secondary SS anchor.

2. The method of claim 1, wherein the primary SS anchor is configured with a primary synchronization signal (PSS), a secondary synchronization signal (SSS), and physical channels carrying system information (SI) for a random-access channel (RACH).

3. The method of claim 1, wherein the detected primary SS anchor is within a block of a contiguous spectrum.

4. The method of claim 1, wherein the detected primary SS anchor is within a VC of the one or more configured VCs.

5. The method of claim 1, wherein the signaling of coding chain rate matching patterns around the SS anchors is a media access control (MAC) control element (CE) or a radio resource control (RRC) layer signal.

6. The method of claim 1, wherein one or more DL secondary SS anchors are configured with synchronization signals.

7. The method of claim 1, wherein one or more DL secondary SS anchors are configured with SSS only.

8. The method of claim 1, wherein the SSS configured for the one or more DL primary SS anchors is an SSS with a first timing (SS1), and wherein one or more DL secondary SS anchors are configured with a PSS and a SSS with a second timing (SS2).

9. The method of claim 1, wherein one primary SS anchor and one or more secondary SS anchors are configured, and wherein each SS anchor uses a different code sequence, and wherein the UE uses the SS sequence in the primary SS anchor as a physical cell identification (PCI) for a common virtual carrier (CVC).

10. The method of claim 1, wherein a plurality of primary SS anchors and one or more secondary SS anchors are configured, and wherein each SS anchor uses a different code sequence, and wherein the UE uses the SS sequence in one primary SS anchor that is used for initial access or being configured by the network as a physical cell identification (PCI) for a common virtual carrier (CVC).

11. A user equipment (UE), comprising:
an initial access manager that performs an initial access by detecting a primary synchronization signal (SS) anchor;
a configurator that obtains a serving cell identification from an SS sequence carried in the detected primary SS anchor; and
a receiver that receives one or more virtual carrier (VC) configurations including a signaling of coding chain rate matching patterns for the one or more VCs from the serving cell;
a synchronization manager that switches to a dedicated virtual carrier (DVC) containing a first secondary SS anchor and performs synchronization through the first secondary SS anchor.

12. The UE of claim 11, wherein the primary SS anchor is configured with a primary synchronization signal (PSS), a secondary synchronization signal (SSS), and physical channels carrying system information (SI) for a random-access channel (RACH).

13. The UE of claim 11, wherein the detected primary SS anchor is within a block of a contiguous spectrum.

14. The UE of claim 11, wherein the detected primary SS anchor is within a VC of the one or more configured VCs.

15. The UE of claim 11, wherein the signaling of coding chain rate matching patterns around the SS anchors is a media access control (MAC) control element (CE) or a radio resource control (RRC) layer signal.

16. The UE of claim 11, wherein one or more DL secondary SS anchors are configured with synchronization signals.

17. The UE of claim 11, wherein one or more DL secondary SS anchors are configured with SSS only.

18. The UE of claim 11, wherein the SSS configured for the one or more DL primary SS anchors is an SSS with a first timing (SS1), and wherein one or more DL secondary SS anchors are configured with a PSS and a SSS with a second timing (SS2).

19. The UE of claim 11, wherein one primary SS anchor and one or more secondary SS anchors are configured, and wherein each SS anchor uses a different code sequence, and wherein the UE uses the SS sequence in the primary SS anchor as a physical cell identification (PCI) for a common virtual carrier (CVC).

20. The UE of claim 11, wherein a plurality of primary SS anchors and one or more secondary SS anchors are configured, and wherein each SS anchor uses a different code sequence, and wherein the UE uses the SS sequence in one primary SS anchor that is used for initial access or being configured by the network as a physical cell identification (PCI) for a common virtual carrier (CVC).

* * * * *